Dec. 14, 1971   G. PRISLAN   3,627,492
PROCESS FOR THE PRODUCTION OF FLOAT GLASS WITH EVEN EDGES
Filed Dec. 30, 1968   3 Sheets-Sheet 1
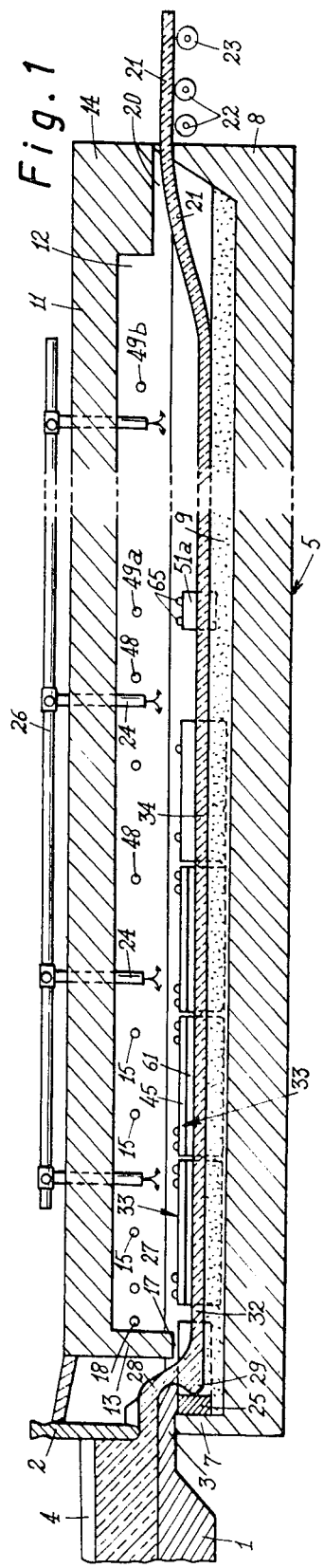
INVENTOR
GEORGES PRISLAN
BY Young + Thompson
ATTYS.

INVENTOR
GEORGES PRISLAN
BY Young & Thompson
ATTYS.

INVENTOR
GEORGES PRISLAN
BY Young + Thompson
ATTYS.

United States Patent Office 3,627,492
Patented Dec. 14, 1971

3,627,492
PROCESS FOR THE PRODUCTION OF FLOAT GLASS WITH EVEN EDGES
Georges Prislan, Boussois, France, assignor to Boussois Souchon Neuvesel, Paris, France
Filed Dec. 30, 1968, Ser. No. 787,975
Claims priority, application France, Jan. 11, 1968, 135,611
Int. Cl. C03b 18/02
U.S. Cl. 65—91                                 1 Claim

ABSTRACT OF THE DISCLOSURE

A process for the manufacture of a ribbon of flat glass by pouring a ribbon of molten glass onto a bath consisting of a liquid which has a higher specific density such as molten tin, said process consisting in causing the forward motion of the glass ribbon by drawing it out of the bath and in containing said ribbon at the sides by means of confining walls which are not wetted by the glass. At least one of the edges of the glass ribbon being formed is subjected downstream of the confining wall to a transverse deflection which tends to thicken said edge.

---

The present invention is concerned with an improved process and installation for the manufacture of a ribbon of flat glass by pouring molten glass onto a liquid bath which has a higher density than that of the glass.

This invention is primarily directed to the manufacture of a ribbon of glass having a greater thickness than the thickness which is naturally acquired by the molten glass in equilibrium under the action of gravity forces and of the interfacial tension between the glass and the bath.

It is known that, when a ribbon of glass having a thickness which is greater than the equilibrium thickness is to be formed on a liquid bath, the ribbon must be contained at the sides in order to limit spreading as it flows forward over the bath during the period when it has not yet congealed.

The ribbon which is undergoing formation can be contained between fixed walls, the spacing of which may or may not be adjustable.

It is known that the edges of the ribbon which is in process of formation may be permitted to slide against the walls with greater ease by lubricating the contact services between glass and walls with a substance such as molten tin, for example, which is in the liquid state at the temperatures considered. It has also been proposed to inject a gaseous fluid through the walls of porous refractory material which are placed on each side of the ribbon.

It is also known that the ribbon of glass being formed can be caused to advance between two parallel rows of carbon barriers which are partly immersed in the bath and which are cooled internally by a circulation of fluid.

In all these techniques, the ribbon which has been endowed with rigidity is subjected to a tractive force by making use of drawing-rollers which are located at the discharge end of the bath.

Moreover, in the method of confinement of the molten glass between two rows of carbon barriers, friction between the glass and said barriers can be minimized by making use of conveying-wheels which each have a horizontal axis and a knurled edge which engages the top face of the edges of the ribbon being formed, thereby facilitating the forward motion of the glass along the barriers. The action of these conveying-wheels on the edges of the ribbon which are located opposite thereto may be differentiated and contributes to a certain extent in obtaining good uniformity in the thickness of the ribbon which is formed. In order to reduce friction between the glass and the carbon barriers and to avoid the use of conveying-wheels, it is also possible to adopt the process and device which have been described in my copending application filed on Dec. 9, 1968 entitled "Process and Installation for the Manufacture of a Ribbon of Flat Glass" in which it is proposed to cool the edges of the glass ribbon being formed whilst said edges are in contact with the carbon barriers by means of cooling units which may have a differentiated action and which are placed close to said edges.

The above-mentioned methods of confinement of the molten glass between stationary walls are subject to disadvantages. In particular, there is found to be a durable inequality of the friction forces exerted at the same level on the opposite edges of the ribbon which is being formed. This inequality can arise, for example, from a prolonged thermal disequilibrium of the bath of molten metal, from faulty positional adjustment of the walls or barriers between which the glass ribbon being formed is confined or from unevenly distributed wear of those faces of said walls or barriers which are in contact with the edges of the ribbon. In all cases, if conveying-wheels which provide the possibility of differentiated action are not employed, there consequently arise instabilities in the thickness of the manufactured glass ribbon and/or prolonged disequilibria between the thicknesses of the opposite edges of the ribbon which arise from dissymmetries in the transverse profile of the ribbon.

On the other hand, if conveying-wheels are employed, better uniformity is obtained in the thickness of the ribbon which is produced but the marks left by the teeth of the knurled wheels at the edges of the ribbon reduce the marketable width of this latter.

The main object of this invention is to provide a remedy for the instability or disequilibrium in the thickness of the manufactured ribbon while avoiding the use of conveying-wheels which have the effect of marketing the glass.

In accordance with the invention, the process for the manufacture of flat glass by pouring a ribbon of molten glass onto a bath consisting of a liquid which has a higher specific density such as molten tin, said process consisting in causing the forward motion of the glass ribbon by drawing it out of the bath and in containing said ribbon at the sides by means of confining walls which are not wetted by the glass is characterized in that at least one of the edges of the glass ribbon being formed is subjected downstream of the confining wall to a transverse action which tends to thrust back said edge.

By virtue of this action which is exerted dissymetrically on one of the edges, it is possible as will be explained hereinafter to regularize the thickness over a transverse section of the glass ribbon.

Although the action produced on the edge of the ribbon can have any direction provided that it comprises a component which tends to thrust back said ribbon, steps are preferably taken to make this action substantially horizontal and perpendicular to the edge of the ribbon.

In a preferred mode of execution of the invention, the transverse action which is exerted on at least one of the edges of the glass ribbon has an intensity such as to cause a displacement of the edge of the glass ribbon relative to its natural position of equilibrium. To this end, the invention proposes to exert this action in a region of the glass-forming tank in which the thermally stabilized ribbon has practically congealed.

In accordance with the invention, the installation for the manufacture of a flat glass ribbon which comprises a tank containing a bath of molten metal on the surface of which a ribbon of glass supported by buoyancy and displaced by floating is drawn to the downstream end of the bath by means of a conveying system and which comprises two parallel confining walls which cannot be wetted by the glass is characterized in that it comprises downstream of the confining walls and on at least one of the edges of the ribbon with a thrust unit supported by a frame whereby said unit is permitted to move across the natural line of equilibrium of the corresponding edge of said glass ribbon.

As a preferable feature, the thrust unit is constituted by a substantially parallelepipedal block which cannot be wetted by the glass and is directed along the greatest length thereof and substantially parallel to the axis of the tank, said thrust unit being supported by a tubular frame which is positionally adjustable and through which the cooling fluid is circulated.

Further particular features of the invention will become apparent from the description which is given hereinafter.

A particular embodiment of the invention is shown in the accompanying drawings which are given solely by way of example and not in any sense by way of limitation, and in which:

FIG. 1 is a diagrammatic longitudinal sectional view of an installation which is arranged in accordance with the invention;

FIG. 2 is a corresponding plan view of the upstream portion of the aforesaid installation;

Figure 3:
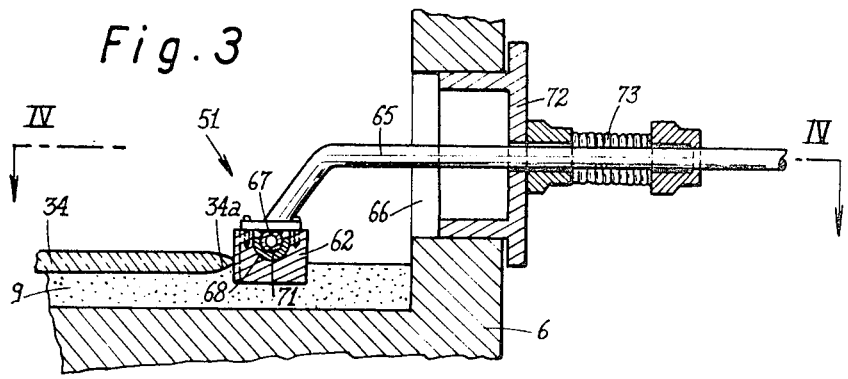
FIG. 3 is an enlarged sectional view in elevation taken along line III—III of FIG. 4 and showing the aforesaid installation at the level of the thrust unit.

It will be assumed in the description which now follows that the invention is applied to an installation for the manufacture of flat glass in conjunction with the invention according to copending application Ser. No. 782,043, filed Dec. 9, 1968, now abandoned.

More specifically, and reference being made to FIGS. 1 and 2, it is seen that the installation comprises in a manner which is known per se a glass-melting furnace in which the discharge channel or forehearth is shown at 1 and provided with a register 2 for regulating the flow of glass. The forehearth 1 has an extension in the form of a spillway comprising a spout 3 and lateral sides 4 which provide the spillway with a cross-section of generally rectangular configuration.

The spillway extends above the floor of a glass-forming tank 5 having side walls 6 which are joined to each other by means of end-walls 7 and 8. The tank 5 contains a bath 9 of molten metal such as tin or a tin alloy, the specific density of which is higher than that of the glass. The tank 5 is adapted to carry a roof comprising an arch 11, side walls 12 and end walls 13 and 14 forming respectively the admission and discharge ends of the bath. The roof thus forms a tunnel above the bath. The molten glass penetrates into the tank 5 through an inlet 17 which is formed between the underface of the end wall 13 and the bottom of the tank 5.

The underface of the end wall 14 of the arch 11 defines with the end wall 8 of the tank 5 an outlet 20 for the final ribbon 21 of glass which has the desired thickness and which is delivered from the bath.

Driving rollers 22 which serve to draw the glass are mounted downstream of the outlet 20 and at a level slightly above the edge of the wall 8. Further drawing and conveying rollers 23 of which only one is shown in the figure and which are located within an ordinary tunnel kiln or lehr (not illustrated) in which the glass ribbon 21 is annealed are adapted to cooperate with the rollers 22 in order to exert a tractive force on the ribbon 21. Under this action, the glass ribbon which floats on the surface of the bath 9 moves towards the outlet 20 and out of the bath, passes upwards onto the rollers 22 and 23 and thus progresses through the lehr to be finally delivered from this latter and cut into primary sheets having the desired dimensions.

The arch 11 is adapted to carry spaced tubes 24, said tubes being connected to pipes 26 through which a shielding gas is supplied. Said gas is thus passed over the tank 5 in order to produce an atmosphere which does not react chemically with the metal of the bath. The outer air is thus prevented from penetrating either through he inlet 17 or through the outlet 20.

Refractory elements 25, 27 which are partly immersed at the upstream end of the bath 9 determine a central region of trapezoidal shape. The element 25 is applied against the inner face of the end wall 7 of the bath. The members 27 form an adjustable divergent passage. The molten glass 28 which is delivered by the spout 3 at a rate of flow which is regulated by the register 2 falls freely over a distance of a few centimeters onto the surface of the bath; a heel 29 of molten glass forms behind the glass which falls from the spillway and extends towards the rear up to the wall of the refractory element 25. The molten glass which falls onto the bath is also confined at the sides by means of the walls 27.

The temperature of the bath is regulated at the admission end of the tank by electric heating with the aid of electrodes 30a, 30b which are placed respectively within the refractory elements 25 and 27 and with the aid of radiators 18 which are placed above the bath 9. The temperature of the molten glass 28 as this latter flows over the spillway is approximately 1100° C. and the thermal conditions within the region which is defined by the retaining walls 25, 27 are such that a hot mass 31 of molten glass is maintained between the aforesaid retaining walls.

The hot mass 31 of molten glass lies on the surface of the bath 9 while moving forward between the walls 27. When it reaches the end of said walls, the molten mass spreads freely and laterally over the bath as shown at 32 in FIG. 2. In this region, the heat regulators ensure that the glass remains in the molten state at a temperature of 1000° C., for example, when the glass is treated by addition of soda, lime and silica, with the result that the desired free lateral flow of molten glass is ensured.

In the embodiment considered, walls for the lateral confinement of the glass ribbon 32 are mounted within the tank 5 downstream of the retaining walls 25 so as to define a passageway for the glass which advances and spreads over the bath 9. In this embodiment, said walls are made up of two parallel rows of barriers 33 which cannot be wetted by the glass and are laterally adjustable. The distance between the barriers 33 is greater than the distance between the downstream extremities of the retaining walls 27. The lateral position of the barriers 33 is adjustable in order to permit the possibility of varying the width of the passageway through which the layer of molten glass 34 flows when it has attained the desired predetermined thickness. The hot glass is stabilized to a greater extent over the bath 9 within the passageway which is defined by the barriers 33, thereby ensuring a substantially parallel relation between the bottom and top surfaces of the glass ribbon.

The temperature of the ribbon 34 of molten glass which moves forward with a predetermined thickness is regulated by means of radiators 15 which are mounted above the bath 9. During the free lateral flow motion, the thickness of the glass decreases, for example, from 17.4 mm. at the downstream end of the hot mass 31 to a thickness of 10 mm. after the free lateral flow of the glass has been prevented.

The barriers 33 each comprise a block 61 formed of material such as carbon which has high temperature strength and which cannot be wetted by the glass. Each block 61 is maintained in position on the bath 9 by means of a tubular stirrup-frame 44 formed by two parallel arms, said arms being adapted to pass through the walls 6 of the tank 5 and connected by means of a tube element which is embedded in the block 61. In order to improve the nonwetting properties of the blocks 61 and to reduce friction between the ribbon 34 and the carbon, a cooling fluid is circulated within the tubular frame 34.

In accordance with the aforesaid application filed by the present applicant, the friction between the barriers 33 and the edges of the glass ribbon 34 is reduced still further by making provision for cooling units 45 which are added to at least a number of barriers 33. Each cooling unit is constituted by a steel tube which extends parallel to the block 61, is placed against said block or at a small distance from this latter and is carried by tubular arms 46 which are preferably heat-insulated, said arms being passed in an adjustable manner through sealed openings formed in the walls 6. During operation, a cooling liquid is circulated through the cooling units 45 and the tubular arms 46 at a flow rate which can be regulated by means of a valve 46a. The tubes 46 and the passageways through the wall 6 permit the possibility of adjusting the position of the cooling units 45 relative to the barriers 33 and to the corresponding edge of the ribbon 34.

As is shown by way of example in FIGS. 1 and 2, the cooling units 45 can be placed parallel to the barriers 33 in immediate proximity to these latter and at a distance of 4 or 5 millimeters above the edge of the glass ribbon 34 which is confined by the barriers 33. At this point, said edges are in the process of congealing under the action of heat regulators 15 which are placed above the bath 9 in the front portion of the tank 5.

In the example illustrated in FIGS. 1 and 2 in which the bath is equipped with two series of parallel barriers 33, wherein each series comprises four barriers placed in end-to-end relation, the cooling units 45 are preferably placed at least against the two first pairs of oppositely facing barriers 33 with which the glass comes successively into contact. The cooling units 45 have the effect of increasing the viscosity of the edges of the ribbon 34 as soon as this latter comes into contact with the barriers 33 and the friction forces are reduced to a considerable extent. The arrangements adopted also make it possible to localize the cooling action solely at the edges of the glass ribbon. Each cooling unit 45 can be supplied with cooling fluid independently of the other unit. By adjusting the valves 46a in a suitable manner, it is thus possible to provide a differential cooling action and consequently to regulate the friction forces between glass and carbon.

By virtue of the cooling units 45, it is unnecessary to employ conveying-wheels for displacing the edges of the ribbon 34 at the level of the barriers 33, with the result that the installation is simplified and the edges of the glass are no longer marked.

When the glass reaches and leaves the end of the passageway which is formed by the barriers 33 while having been progressively cooled by the heat regulators 48 which are mounted beneath the arch 11 and above the central portion of the tank 5, the glass has set to a sufficient extent to be no longer liable to spread over the bath. The glass in the form of a ribbon continues to move forward along the bath while being cooled by means of heat regulators 49a, 49b which are mounted in the end portion of the tank 5. When the ribbon has acquired a sufficient degree of rigidity, the portion 21 is accordingly formed and withdrawn from the bath.

In accordance with the present invention, provision is made within the glass-forming tank 5 downstream of the ribbon-confining walls constituted by the barriers 33 for two thrust units 51 as designated in FIGS. 1 and 2 by the references 51a and 51b, said thrust units being of similar structural design and placed in oppositely facing relation. In FIG. 2, the thrust unit 51a is assumed to be in service whilst the thrust unit 51b is in the rest position. The reciprocal positions are shown in broken lines. For example, the thrust units 51 can be located at a distance comprised between 3 and 4.5 meters from the ends of the barriers 33, for example at a distance of 3.8 meters. The thrust units 51a, 51b are so arranged that, during operation, each unit is capable of crossing the line corresponding to the position of equilibrium of the proximate edge of the ribbon 34 in order to exert on said edge a localized thrust $F_a$, $F_b$ respectively which is oriented transversely with respect to the direction G of flow of said ribbon.

Figure 4:
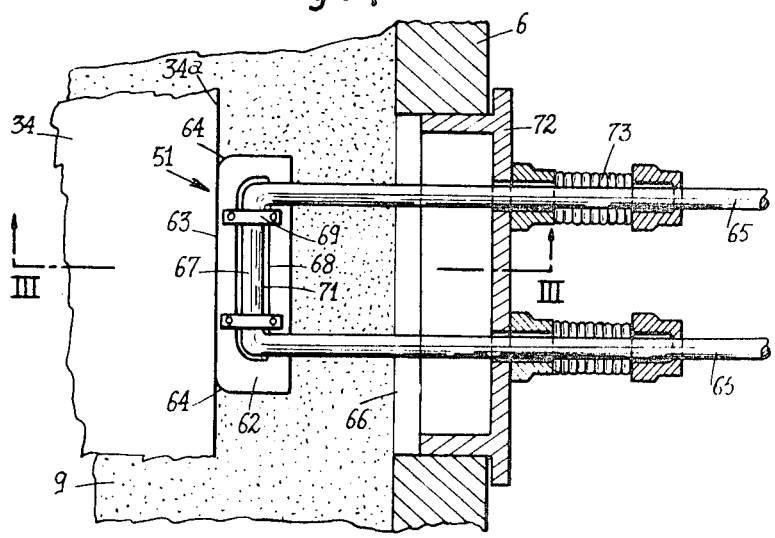
FIG. 4 is a corresponding sectional plan view taken along line IV—IV of FIG. 3.

With this objective, each thrust unit 51 comprises (as shown in FIGS. 3 and 4) a substantially parallelepipedal shoe 62 formed of a material such as carbon which cannot be wetted by the glass and having a front face 63 which terminates in two rounded extremities 64. The shoe has a length of 50 cms., for example, and is so oriented that the longest dimension thereof is substantially parallel to the longitudinal axis of the tank 5.

The shoe 62 is supported by a tubular stirrup-frame formed, for example, of heat-resisting steel and through which a cooling liquid such as water may be circulated. Said tubular frame consists of two parallel arms 65 which traverse the wall 6 through an opening 66 and are joined to each other by means of a transverse arm 67 fitted within a longitudinal groove 68 which is formed in the top surface of the shoe 62.

The arm 67 is welded to two brackets 69 of heat-resisting steel which are bolted onto the carbon shoe 62 and the space comprised between the arm 67 and the groove 68 is filled with a substance 71 such as tin which has good heat conductivity and facilitates heat transfer processes between the shoe 2 and the cooling liquid.

The arms 65 of the tubular frame which support the shoe 62 are adapted to pass through the opening 66 by means of a leak-tight through-passage assembly comprising a heat-resisting shield 72 which is inserted in said opening and fitted with extensible bellows elements 73, the ends of which are respectively attached to the shield 72 and to the arms 65.

Figure 5:
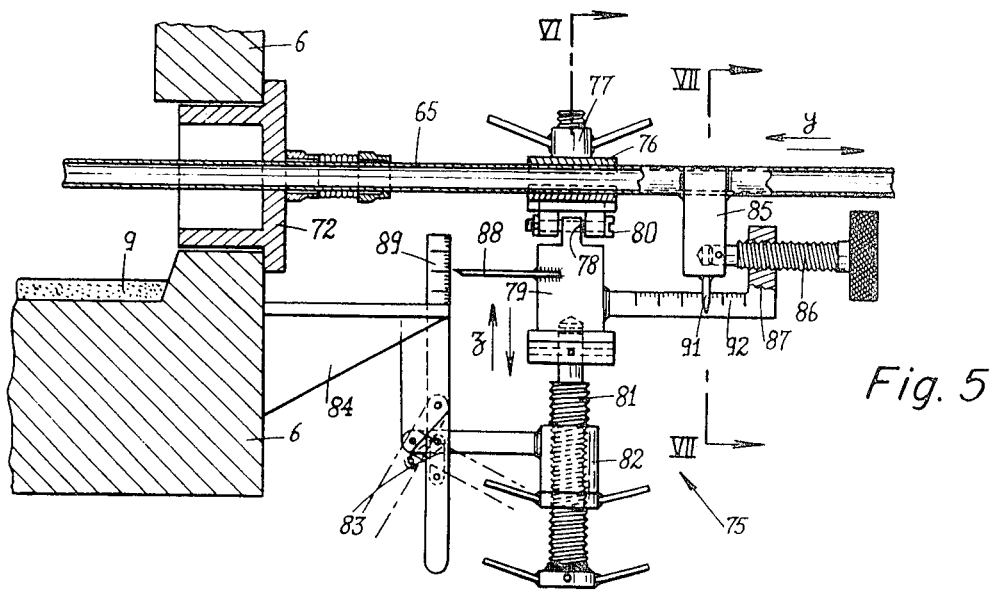
FIG. 5 is a view which is similar to FIG. 3 showing the tubular frame of the thrust unit and the external mounting of said frame.
Figure 6:
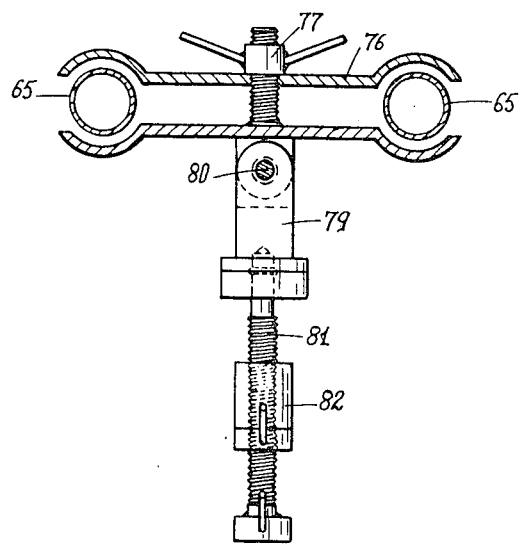
FIG. 6 is a partial sectional view taken along line VI—VI of FIG. 5.
Figure 7:
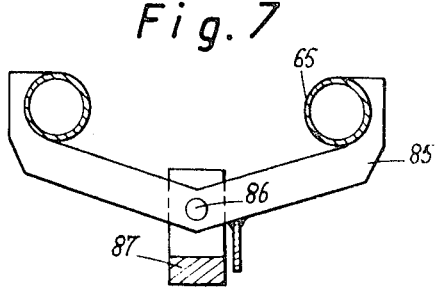
FIG. 7 is a partial sectional view taken along line VII—VII of FIG. 5.

The tubular frame 65, 67 is carried outside the tank 5 by a support structure 75 (as shown in FIGS. 5 to 7) which permits of measured and adjustable displacements of said frame. More precisely, the support structure 75 comprises a clamp 76 which is operated by a wing-nut 77 and intended to grip the tubes 65. The clamp 76 is connected by means of a pivotal mounting 78 fitted with a clamping screw 80 to a nut 79 carried by a screw 81 which is mounted in a threaded sleeve 82, said sleeve being in turn carried by a rapid-withdrawal toggle mechanism 83 of a known type which is pivotally mounted on a right-angled bracket 84 of the wall 6. The arms 65 are spaced by a collar 85 in which is rotatably mounted a screw 86 which is engaged with a right-angled bracket 87 of the nut 79.

The unitary displacements are controlled by means of a pointer 88 of the nut 79, said pointer being intended to move in front of a vertical scale 89 of the bracket 84, and by means of a pointer 99 of the collar 85 which is adapted to move in front of a horizontal scale 92 of the bracket 87.

It is understood that the pivotal mounting 78 and screw 80 serve to adjust the horizontality of the arms 65 and consequently of the shoe 62. The screw 81 serves to adjust the position-setting of the shoe by displacement of the nut 79 in the direction z. Finally the screw 86 permits the transverse displacement of the shoe 62 in the direction y and parallel thereto. The amplitude of these different displacements is controlled by the movements of the pointers 88, 91 in front of the corresponding scales.

When the carbon shoe 62 has been placed in the horizontal position by displacement of the tubular frame in the direction y, said shoe can be moved either towards or away from the edge 34a of the glass ribbon 34. As a result of displacement in the direction z, the shoe 62 can be immersed in the bath 9 to a greater or lesser extent. When the positional adjustment operation has been completed, the shoe 62 can be locked and its position recorded. Finally, by means of the toggle mechanism 83 which is moved into the position shown in chain-dotted lines, it is possible by means of a rapid movement to withdraw the shoe 62 from the edge 34a of the glass ribbon and to place said shoe above the bath 9 in a case of emergency.

The heat regulators 49a which are located above the bath 9 in vertically opposite relation to the thrust units 51 serve to regulate the viscosity of the glass which constitutes the ribbon 34 so that this latter should congeal to a sufficient extent to ensure that the edges of the ribbon can come into contact with the thrust unit 51a and be subjected to the action of this latter without thereby sustaining any damage. Under normal conditions, only one thrust unit is set in operation according to the result which is sought.

In the example which is illustrated, the thrust unit 51a tends to displace the glass ribbon in the direction $F_a$. Consequently, the friction force to which the ribbon 34 is subjected along at least a part of the barriers 33 which are located on the same side as said ribbon with respect to the axis of said bath is reduced and the friction exerted on the ribbon 34 along at least a part of the opposite barriers 33 is increased. The thrust unit 51a which is in service therefore effectively acts as a means for regulating the friction between the edges of the ribbon and the barriers.

Figure 8:
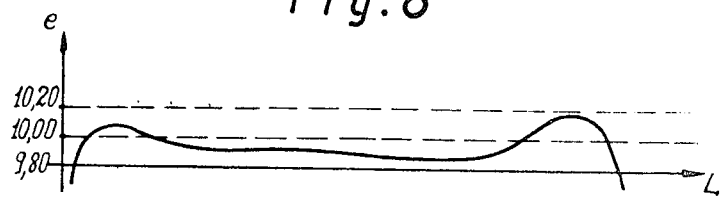
FIGS. 8 and 9 are diagrams showing the variations in thickness of the glass ribbon in the same transverse sectional plane respectively without and with application of a transverse thrust on one of the edges of said ribbon.
Figure 9:
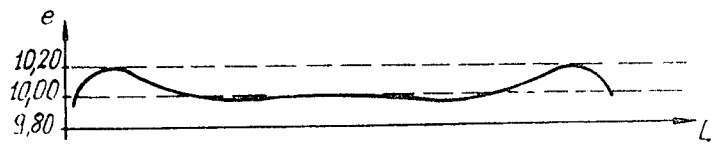

In order that the action of the thrust unit 51a may be more readily understood, reference will be made to FIGS. 8 and 9 which show in rectangular coordinates two transverse profiles of a glass ribbon 34 having a width L of approximately 3 meters and a thickness e of approximately 10 millimeters as manufactured in accordance with the method of the invention but without making use of devices 45 for cooling the edges of the glass ribbon. FIG. 8 represents a profile which is obtained without making use of the thrust units 51. It is observed that the edges of the ribbon exhibit unequal overthicknesses: the edge shown on the left of said figure is the one which passes in front of the thrust unit 51a and is of smaller thickness than the right-hand edge. The measured difference is 0.18 mm. FIG. 9 represents the profile which is obtained, all other things being equal, by causing the thrust unit 51a to produce action under the following conditions: the thrust 51a is placed against the oppositely facing edge 34a of the ribbon 34 without exerting any pressure on said edge, whereupon the thrust unit is displaced over a distance of 50 mm. in the direction y towards the axis of the bath and is locked in this position. A small transverse thrust is thus exerted on the edge of the ribbon in the direction $F_a$, as shown in FIG. 2. It is noted that the profile is accordingly modified by the action resulting from the thrust unit: on the one hand, the overthicknesses have become substantially equal and, on the other hand, the profile has a shape which is much more symmetrical than that of FIG. 8 and which corresponds to a higher quality of manufacture. It will be readily understood that, without thereby departing from the intended scope of the invention, it would also be possible to control the positions of the thrust units 51a, 51b in dependence on the profile of the ribbon which is produced in order to obtain a profile having predetermined characteristics.

By combining the action of the thrust unit 51a or 51b with the action of the cooling unit 45 which may be differentiated, it is possible to obtain a profile which has a high degree of uniformity. It will also be noted that the additional cooling which is transmitted to the edges of the ribbon 34 by the cooling units 45 by increasing the rigidity of said edges facilitates the application of the thrusts $F_a$, $F_b$ without thereby entailing any danger of local deformation of the ribbon.

It is apparent that the invention is not limited to the embodiment which has just been described and for which alternative forms of execution can accordingly be contemplated. The invention thus remains applicable when the molten glass which is deposited on the bath is continuously confined between stationary walls and not between adjustable barriers up to the moment when the glass is permitted to move away from said walls after having set to a sufficient extent. The invention is also applicable when the manufactured ribbon has a thickness which is either equal to or smaller than the thickness naturally assumed by the molten glass in equilibrium under the action of gravity forces and of the interfacial tension between glass and bath, this result being obtained by modifying said equilibrium, for example by exerting a pressure on the top face of the glass in that zone in which the molten glass is contained between confining walls.

I claim:

1. A process for the manufacture of a ribbon of flat glass by pouring molten glass onto a bath consisting of a molten liquid which has a higher specific gravity than the glass, comprising drawing the glass along the bath to cause the glass to form a ribbon, confining said ribbon at the sides thereof by means of confining walls which are not wetted by the glass, said ribbon between said confining walls having one longitudinal edge thereof thinner than the other longitudinal edge thereof, downstream of said confining walls moving an upright surface horizontally across the path of and into contact with said thinner edge in a direction toward said other edge a distance such that said thinner edge is deflected toward said other edge when flowing about said upright surface and thickens to the thickness of said other edge, and locking said upright surface in contact with said thinner edge.

References Cited

UNITED STATES PATENTS

| | | | |
|---|---|---|---|
| 3,223,503 | 12/1965 | Barradell-Smith et al. | 65—99 |
| 3,450,518 | 6/1969 | Itakura et al. | 65—182 |
| 3,468,653 | 9/1969 | Robinson et al. | 65—182 X |
| 3,528,795 | 9/1970 | Swillinger | 65—182 |

S. LEON BASHORE, Primary Examiner

J. B. HARDAWAY, Assistant Examiner

U.S. Cl. X.R.

65—99 A, 182 R